July 17, 1934.    J. L. IRVIN    1,966,819
SLUGGING LIQUIDS THROUGH CONDUITS AND THE LIKE
Filed Oct. 8, 1932
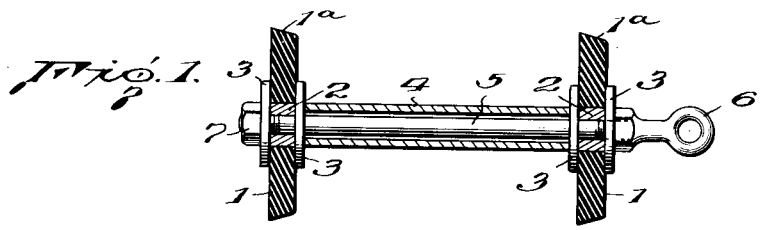
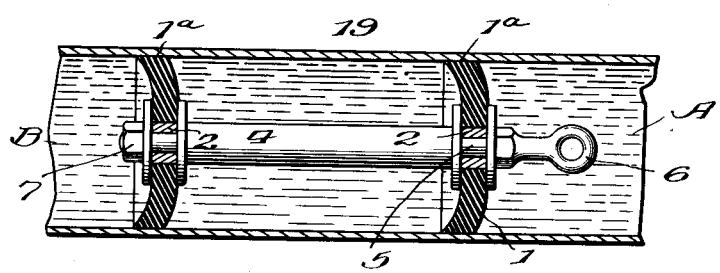
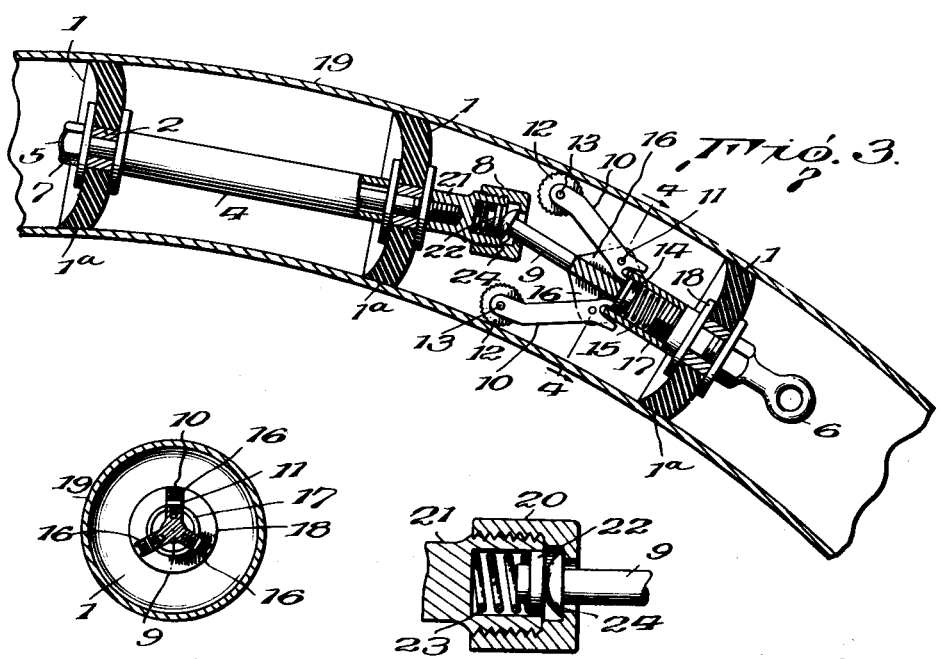
Inventor
J. L. Irvin
A. M. Houghton
By
his Attorney Patented July 17, 1934

1,966,819

UNITED STATES PATENT OFFICE 1,966,819

SLUGGING LIQUIDS THROUGH CONDUITS AND THE LIKE

John L. Irvin, Houston, Tex., assignor to Gulf Pipe Line Company, Houston, Tex., a corporation of Texas Application October 8, 1932, Serial No. 636,903

7 Claims. (Cl. 137—78)

This invention relates to slugging liquids through conduits and the like; and it comprises a method of successively flowing separated bodies of different liquids through conduits, pipes, pipelines, etc., without contamination and intermixture, wherein a positive boundary is maintained between said separated bodies of liquid, pressure is applied to one of said bodies of liquid causing said bodies to flow in one direction and to simultaneously move said boundary, and the surface films of liquid adhering to the walls of said conduit are progressively removed between the said separated bodies of liquid; and it further comprises apparatus and means for so slugging liquids, said apparatus comprising a suitable conduit and a slugging device adapted to enter and move through said conduit with minimum friction and capable of separating said bodies of liquid and maintaining a positive boundary between them, and of removing said surface films when pressure is applied to one of said liquids, said slugging device comprising a plurality of flexible, resilient discs securely mounted in a concentric and spaced relation to each other; all as more fully hereinafter set forth and as claimed.

It is now common practice to convey liquids for great distances by pumping the liquids through conduits or pipe-lines. These pipe-lines may extend many miles across country. They contain a very large volume of liquid. It is not feasible to construct a separate pipe-line for each liquid to be conveyed. Hence, it is customary to "slug" successive bodies of liquid through in one direction by pumping one such body of liquid in direct contact against another. This customary procedure is objectionable for several reasons, the principal one being the intermixing of the liquids, one contaminating the other. Such mixing and contamination is not only objectionable but also is a loss. The contaminated liquid must either be re-processed to separate its components or be discarded as a low-grade or worthless material. Sometimes, when widely dissimilar liquid bodies are being pumped, a body of oil of intermediate qualities is sent between the two bodies. This lessens the deleterious effects of intermixing, but there is a loss of quality on each side.

As the pipe-line contains a large volume of liquid, considerable time elapses after the second liquid is pumped in the line before the displacement of all the first liquid from the line. Thus, although the rate of mixing may be slow, the amount of mixing may be substantial.

Mixing at the point of direct contact is pronounced. It is increased if the flow through the line is turbulent and in such cases extends a considerable distance from the original contact area. Further, as the liquids flow through the pipe-line, a film of liquid adheres to the wall of the pipe, and this film from the first liquid gradually blends with the following second liquid so that contamination may continue, even after the main body of the first liquid has been pumped out.

The present invention prevents and obviates these difficulties. It widens the range of different liquids which may be "slugged", that is, successively pumped through a given conduit. Thus the flexibility of this method of conveying liquids is increased. Also, the efficiency with a given set of liquids is increased and losses otherwise encountered are prevented.

By my present methods liquids of different character may be successfully slugged or successively flowed through a single conduit or pipe-line in one direction, without any substantial intermixture or contamination. In my process, a suitable slugging device is inserted at one point in the conduit containing the first liquid, and then the second liquid is introduced into the conduit and pumped toward a distant point. The conduit and slugging device are so inter-related and constructed, that a positive boundary between the different liquids is maintained, the boundary moving with the liquids when pressure is applied to the second liquid and that liquid films from the first liquid are removed from the surface of the conduit before the second liquid contacts with said surfaces. The liquids are thus progressively moved from one point to another and recovered without substantial intermixture.

I have developed a slugging device of simple structure which is commercially satisfactory. This slugging device although of sturdy construction and capable of withstanding long use, is constructed of a comparatively few simple elements, is of relatively light weight and is inexpensive. The slugging device comprises a plurality of flexible resilient discs, each of such diameter and thickness as to maintain a substantial peripheral area in positive contact with the walls of the conduit, securely mounted co-axially and spaced apart from each other in substantially parallel planes; said discs being usually removably mounted upon a tie-rod of a diameter very much less than the diameter of the conduit. The spacing between the pairs of discs is sufficient to stabilize the slugging device against tilting while confined within the conduit, but is less than that which would cause the slugging device to jam when following the contour of the pipes through bends of a radius commonly used in such pipe-lines. When more than two discs are employed, it is advantageous to place a flexible joint such as a toggle joint in the tie-rod between one or more pairs of discs. In this way a slugging device of considerable length and having several discs may easily follow the conduit in turning curves and bends, even of comparatively short radius. In order to ensure a substantial peripheral area in positive contact with the walls of the conduit, it is particularly advantageous to have the periphery of said discs made in the form of truncated cones, the smaller diameter of the frustrum being slightly greater than the internal diameter of the pipe. When a slugging device having discs of this type is inserted in the conduit, the conical surface completely contacts the wall of the conduit due to a slight deformation of the disc. Thus a substantial peripheral area of the disc is maintained in positive contact with the walls. Due to the simple construction of my slugging device, it may be constructed of the usual metals and yet be of comparatively light weight. It may be moved through conduits and pipe-lines with comparatively little friction and yet maintain a positive boundary between different bodies of liquids and thoroughly remove adhering liquids from the walls of the conduits. The weight and friction characteristics of my slugging device are such that it may easily be moved through ordinary conduits by means of the customary pressures used in commercial pumping of various liquids through pipe-lines. No pressure differential is created of any substantial magnitude, and normal operation of the pipe-line is not disturbed. Various different liquids may be successively slugged through pipe-lines in one direction without substantial intermixture and contamination and without substantial altering of present commercial practice as regards pressure, rate of flow, pump displacement and the like. To facilitate removal of the slugging device after it has traversed the pipe-line, I may attach suitable handling devices such as eyebolts and the like to one end of the slugging device such as the tie-rod at its terminal point. These eyebolts or like withdrawal means are merely to facilitate removing the slugging device from the pipe-lines. They are not necessary for moving the device through the pipe-line as ordinary pressures are sufficient but are also advantageous in case where the device becomes accidentally jammed, for instance, where the pipe has been crushed, dented or otherwise damaged by external agency.

A simple way of constructing my slugging device is to insert a tie-rod threaded on each end, through a hollow cylinder or pipe, mount a pair of washers or annular plates on said rod and abutting said spacer, next position against said washers a pair of discs carried on suitable bushings, place next to the washers a second pair of discs and then lock the assembled elements together by means of nuts screwed down upon said threads of the tie-rod. This assemblage is comparatively simple. The tie-rod serves as a central member upon which all the elements are mounted, the hollow cylinder or pipe serves as a spacing means; the washers serving as backing plates to support and reenforce the resilient discs and the nuts at each end of the tie-rod as locking means to maintain the elements securely in place. Such a structure is relatively simple to assemble and disassemble for repair or replacement. The metallic parts may be all iron or steel. However, other metals may be used, giving due care to their selection in reference to the liquid to be pumped. If slugging devices of rather light weight are desirable, aluminum alloys or other light weight alloys may be used.

In the accompanying drawing, I disclose specific embodiments of my invention which are satisfactory and advantageous.

In the accompanying drawing:

Fig. 1 is a longitudinal view, partly in section of the slugger.

Fig. 2 is a similar view of the slugger showing the same in position in a conduit and separating two bodies of different liquids.

Fig. 3 is a similar view of the slugger showing a guiding attachment applied to the forward end thereof and illustrating the action of toggle joints when the slugger goes around a bend in the conduit.

Fig. 4 is a section through the guiding attachment taken on line 4—4 of Fig. 3.

Fig. 5 is an enlarged showing of the toggle joint.

As illustrated in the accompanying drawing the slugger consists of flexible discs 1 of rubber or similar material, said discs having cone shaped peripheral surfaces 1—a and the diameters of the discs being greater than the internal diameter of a conduit 19, so that the discs assume cup shaped forms when inserted in the conduit as shown in Fig. 2. Each disc 1 is mounted upon a bushing 2. A steel tie rod 5 passes through the bushings 2 and a pull out eye 6 is screwed upon or otherwise applied to one end of said tie-rod. Backing plates 3 are applied to the opposite sides of the discs. A spacer 4 receives the intermediate portion of the tie-rod and bears against the inner sides of the inner backing plates. A nut 7 is screwed upon the end of the tie-rod 5 and holds the parts in position thereon as shown. When the slugger is inserted in the conduit as shown in Fig. 2 of the drawing, it is located between the columns of liquid A and B and the space between the discs is filled with a plenum of liquid. The liquid A is forced through the conduit when pressure is applied to the column of liquid B.

The conduit 19 is of substantial length and of substantially uniform cross section and as the discs bear at their edges against the walls of the conduit the liquid A is prevented from mixing with the liquid B and vice versa. The action of the edges of the discs against the smooth surface of the conduit is the same as that of a squeegee against a glass surface and therefore the separation of the columns of liquids is complete and one liquid cannot mix with and contaminate the other.

A guide for the slugger consists of a toggle socket 8 which is screwed upon the rod 5. A rod 9 is toggled to the socket member 8. Arms 10 are pivoted at 11 to the rod 9 and carry at their outer ends rollers 12 journaled upon pins 13. A disc 1 is carried by the rod 9 and is adapted to bear against the surface of the conduit. A spring 15 is provided with a button 14 which bears against the ends of the arms 10 and causes the rollers to bear against the walls of the conduit and are maintained under tension against the walls and thus the forward disc will travel perpendicular to the axis of the conduit and the slugger is guided around a bend in the conduit.

In Fig. 4 the circumferential spacing of the plates 16 for supporting the arms 10 around the toggle rod 9 is clearly shown as well as the snug fit between the conduit 19 and the flexible discs 1. In this Fig. 4, 16, 17 and 18 designate the enlarged and flanged continuation of toggle rod 9.

In Fig. 5 the details of the toggle joint 8 are shown. A toggle cap 20 is screwed down upon toggle head 21. Within the toggle head is mounted a spring 23 and button 22. The head 24 of toggle rod 9 is securely but flexibly held against the toggle cap by the button 22 and spring 23.

By using my invention bodies of dissimilar liquids may be pumped through conduits for many miles with substantially no intermixture. The present invention represents a solution of the problem of slugging dissimilar liquids through pipe lines without contamination. This is made possible by establishing and maintaining a positive moving boundary, fluid tight yet freely moving under fluid pressure, between the two bodies of liquid in the conduit.

What I claim is:

1. The improved process of slugging liquids through conduits of considerable length containing bends and like changes in direction, which comprises establishing and maintaining a positive boundary between separated bodies of liquid, applying pressure to one of said bodies of liquid, moving said bodies of liquid through said conduit in one direction and simultaneously moving such boundary, through said conduit and past said bends without by-passing substantial amounts of said liquids, and progressively removing the liquid surface films from the walls of said conduits between the separated bodies of liquid.

2. The improved process of progressively and successively flowing separated bodies of different liquids through conduits of considerable length containing bends and like changes in direction without substantial contamination and intermixture, which comprises maintaining a positive boundary between said bodies of liquid by means of a plurality of discs held in positive flexible resilient contact with said conduit and having a substantial peripheral area of contact with said conduit and applying pressure to one of said liquids, thereby successively flowing said liquids through said conduit while maintaining and simultaneously moving said positive boundary through said conduit and past said bends without by-passing substantially amounts of said liquids, and removing surface films of liquid from the conduit walls to prevent contamination and intermixture.

3. The improved process of slugging two dissimilar bodies of liquid through conduits of substantial length and of substantially uniform cross section which comprises establishing and maintaining a moving boundary between the two bodies of liquid and in resilient, sliding, sealing contact with the walls of the conduit, applying pressure to one of said bodies of liquid so as to move the said body of liquid, the boundary, and the other body of liquid through the conduit, and removing liquid surface films from the walls of the conduit at the boundary, whereby intermixture of the liquid bodies is substantially prevented.

4. The improved process of slugging two dissimilar bodies of liquid, through conduits of substantial length and of substantially uniform cross section which comprises establishing and maintaining a plurality of spaced, moving boundaries between the two bodies of liquid and in resilient, sliding, sealing contact with the walls of the conduit, applying pressure to one of said bodies of liquid so as to move the said body of liquid, the boundaries, and the other body of liquid through the conduit, removing liquid surface films from the walls of the conduit, and maintaining a moving body of liquid between two of the boundaries whereby substantially no intermixture of the liquid bodies takes place.

5. An improved slugging device for successively flowing two dissimilar bodies of liquid through conduits of substantial length and of substantially uniform cross section without substantial intermixture, said device comprising three flexible, resilient, liquid-impervious, frustoconical discs having diameters slightly greater than the diameter of the inside of the conduit, affording a large area of contact with the wall of the conduit, and means for holding the discs in concentric spaced relationship, said means comprising a tie rod joining two of the discs and a second tie rod carrying the third disc at one end and at the other end being pivotally connected with one end of the first tie rod, said slugging device maintaining a tight moving seal in the conduit and removing liquid surface films from the walls thereof, and being capable of free motion in the conduit when impelled by liquid pressure.

6. The process of delivering a plurality of different liquids from a near point to a distant point without substantial intermixture, which comprises forcing a quantity of one liquid through a pipe from the near toward the distant point and under pump pressure, inserting a movable separating partition in the pipe at the near point, supplying to the pipe from the near point a second liquid to be delivered to the distant point and moving the second body of liquid by pump pressure to cause it to move the said separating partition and the first body of liquid through the pipe while maintaining a boundary between the two liquids during their travel from the one point to the other.

7. An improved process of transporting separated bodies of different liquids through a conduit from a near point to a distant point which comprises introducing a quantity of one liquid into said conduit at the near point and forcing said liquid through the conduit toward the distant point under pressure, inserting a movable separating partition in the conduit at the near point, subsequently introducing a second liquid into said conduit at the near point, forcing said second liquid toward the distant point under pressure to cause it to move the partition and the first quantity of liquid through the conduit while maintaining a positive boundary between the two liquids and separately recovering the first liquid, the second liquid and the partition from the conduit at said distant point.

JOHN L. IRVIN.